United States Patent
Deshpande et al.

(10) Patent No.: US 8,645,985 B2
(45) Date of Patent: Feb. 4, 2014

(54) SYSTEM AND METHOD FOR DETECTING USER ATTENTION

(75) Inventors: Hrishikesh R. Deshpande, Pacifica, CA (US); Ruxin Chen, Redwood City, CA (US)

(73) Assignee: Sony Computer Entertainment Inc. (JP)

( * ) Notice: Subject to any disclaimer, the term of this patent is extended or adjusted under 35 U.S.C. 154(b) by 1130 days.

(21) Appl. No.: 11/368,766

(22) Filed: Mar. 6, 2006

(65) Prior Publication Data

US 2007/0061851 A1  Mar. 15, 2007

Related U.S. Application Data

(60) Provisional application No. 60/718,145, filed on Sep. 15, 2005.

(51) Int. Cl.
*G06F 15/18* (2006.01)
*G06F 17/00* (2006.01)

(52) U.S. Cl.
USPC .................................. 725/10; 706/11; 706/14

(58) Field of Classification Search
None
See application file for complete search history.

(56) References Cited

U.S. PATENT DOCUMENTS

| | | | |
|---|---|---|---|
| 4,787,051 A | 11/1988 | Olson | |
| 4,843,568 A | 6/1989 | Krueger et al. | |
| 5,128,671 A | 7/1992 | Thomas, Jr. | |
| 5,463,565 A | 10/1995 | Cookson et al. | |
| 5,528,265 A | 6/1996 | Harrison | |
| 5,617,407 A | 4/1997 | Bareis | |
| 5,719,951 A * | 2/1998 | Shackleton et al. | 382/118 |
| 5,839,099 A * | 11/1998 | Munsell et al. | 704/207 |
| 6,154,559 A * | 11/2000 | Beardsley | 382/103 |
| 6,157,368 A | 12/2000 | Fager | |
| 6,219,645 B1 | 4/2001 | Byers | |
| 6,375,572 B1 | 4/2002 | Masuyama et al. | |
| 6,560,511 B1 | 5/2003 | Yokoo et al. | |
| 6,665,644 B1 | 12/2003 | Kanevsky et al. | |
| 6,842,510 B2 | 1/2005 | Sakamoto | |

(Continued)

FOREIGN PATENT DOCUMENTS

DE 44 39 257 10/1995
EP 0 978 301 A1 2/2000

(Continued)

OTHER PUBLICATIONS

S. Pfeiffer et al., "Automatic Audio Content Analysis", ACM Multimedia, 1996.*

(Continued)

*Primary Examiner* — Jason J Chung
*Assistant Examiner* — James R Marandi
(74) *Attorney, Agent, or Firm* — Lerner, David, Littenberg, Krumholz & Mentlik, LLP

(57) ABSTRACT

A system and method for conditioning execution of a control function on a determination of whether or not a person's attention is directed toward a predetermined device. The method involves acquiring data concerning the activity of a person who is in the proximity of the device, the data being in the form of one or more temporal samples. One or more of the temporal samples is then analyzed to determine if the person's activity during the time of the analyzed samples indicates that the person's attention is not directed toward the device. The results of the determination are used to ascertain whether or not the control function should be performed.

27 Claims, 3 Drawing Sheets

(56) References Cited

U.S. PATENT DOCUMENTS

| | | | |
|---|---|---|---|
| 6,867,818 | B2 | 3/2005 | Bray |
| 6,872,139 | B2 | 3/2005 | Sato et al. |
| 6,884,171 | B2 | 4/2005 | Eck et al. |
| 6,889,383 | B1 | 5/2005 | Jarman |
| 6,890,262 | B2 * | 5/2005 | Oishi et al. ............ 463/31 |
| 7,046,139 | B2 | 5/2006 | Kuhn et al. |
| 7,081,579 | B2 | 7/2006 | Alcalde et al. |
| 7,233,933 | B2 * | 6/2007 | Horvitz et al. .......... 706/21 |
| 7,472,424 | B2 | 12/2008 | Evans et al. |
| 2001/0027414 | A1 | 10/2001 | Azuma |
| 2002/0002483 | A1 | 1/2002 | Siegel et al. |
| 2002/0046030 | A1 | 4/2002 | Haritsa et al. |
| 2002/0078204 | A1 * | 6/2002 | Newell et al. ........... 709/225 |
| 2002/0085097 | A1 | 7/2002 | Colmenarez et al. |
| 2002/0144259 | A1 * | 10/2002 | Gutta et al. ............. 725/10 |
| 2002/0184098 | A1 | 12/2002 | Giraud et al. |
| 2003/0097659 | A1 | 5/2003 | Goldman |
| 2003/0126013 | A1 | 7/2003 | Shand |
| 2003/0130035 | A1 | 7/2003 | Kanarat |
| 2003/0147624 | A1 | 8/2003 | Trajkovic et al. |
| 2003/0169907 | A1 * | 9/2003 | Edwards et al. ......... 382/118 |
| 2003/0199316 | A1 | 10/2003 | Miyamoto et al. |
| 2004/0015998 | A1 | 1/2004 | Bokor et al. |
| 2004/0030553 | A1 | 2/2004 | Ito et al. |
| 2004/0193425 | A1 | 9/2004 | Tomes |
| 2004/0199387 | A1 | 10/2004 | Wang et al. |
| 2004/0201488 | A1 | 10/2004 | Elul |
| 2004/0212589 | A1 | 10/2004 | Hall et al. |
| 2005/0199783 | A1 * | 9/2005 | Wenstrand et al. ...... 250/214.1 |
| 2006/0004640 | A1 | 1/2006 | Swierczek |
| 2006/0133624 | A1 | 6/2006 | Waserblat et al. |
| 2007/0021205 | A1 | 1/2007 | Filer et al. |
| 2007/0060350 | A1 | 3/2007 | Osman |
| 2007/0061413 | A1 | 3/2007 | Larsen et al. |
| 2007/0135187 | A1 | 6/2007 | Kreiner et al. |
| 2007/0243930 | A1 | 10/2007 | Zalewski et al. |
| 2007/0244751 | A1 | 10/2007 | Zalewski et al. |
| 2007/0255630 | A1 | 11/2007 | Zalewski et al. |
| 2007/0260517 | A1 | 11/2007 | Zalewski et al. |
| 2007/0261077 | A1 | 11/2007 | Zalewski et al. |

FOREIGN PATENT DOCUMENTS

| | | |
|---|---|---|
| EP | 1 079 615 | 2/2001 |
| FR | 2 814 965 | 4/2002 |
| WO | WO-00/01456 | 1/2000 |
| WO | 02/093917 | 11/2002 |

OTHER PUBLICATIONS

Nathanael Rota and Monique Thonnat; "Video Sequence Interpretation for Visual Surveillance," Proc. of 3rd IEEE Int'l Workshop on Visual Surveillance, pp. 59-67, Dublin, Ireland, Jul. 1, 2000.*

Silvia Pfeiffer et al., "Automatic Audio Content Analysis," Proc. ACM Multimedia 96, pp. 21-30, Boston, Mass., Nov. 1996.*

Y. Matsumoto et al., "Behavior Recognition Based on Head Pose and Gaze Direction Measurement", Proceddings of the 2000 International Conference on Intelligent Robots and Systems, IEEE, 2000.*

Unreal Tournament 2004 for Windows: Product Reviews, Apr. 3, 2004.

Sungbok Lee, Alexandros Potamianos, and Shrikanth Narayanan; Acoustics of Children's Speech: Developmental Changes of Temporal and Spectral Parameters, J. Acoust. Soc. Am. 105 (3), Mar. 1999. http://faculty.augie.edu/~pchanavan/speech/Chapter6.ppt; Perry C. Hanavan; Chapter 6, Vocal Mechanism.

www-ccrma.stanford.edu/~pdelac/154/m154paper.htm; Pitch Detection Methods Review (printed on Feb. 14, 2006).

Richard J. Campbell and Patrick J. Flynn; A Survey of Free-Form Object Representation and Recognition Techniques; copyright 2001. http://sail.usc.edu/publications/LePoNa_kidsAcous_JASA1999.pdf; Kazuo Hiyane and Jun Iio, Mitsubishi Research Institute, Inc.; RWCP Sound Scene Database in Real Acoustical Environments Non-Speech Sound Recognition With Microphone Array, Copyright 1998-2001.

Schneiderman and Kanade, Robotics Institude—Face Detection, Project Descripton, www.ri.cmu.edu/projects/project_416.html.

Office Action from U.S. Appl. No. 11/403,179, mailed Dec. 8, 2009.

Gentile, Gary. "New DVD palyers can filter movie content", http://www.msnbc.msn.com/id/4780312, Apr. 2004.

Bolt, R.A., "Put-that-there": voice and gesture at the graphics interface, Computer Graphics, vol. 14, No. 3 (ACM Siggraph Conference Proceedings) Jul. 1980, pp. 262 270.

DeWitt, Thomas and Edelstein, Phil, "Pantomation: A System for Position Tracking," Proceedings of the 2nd Symposium on Small Computers in the Arts, Oct. 1982, pp. 61-69.

* cited by examiner

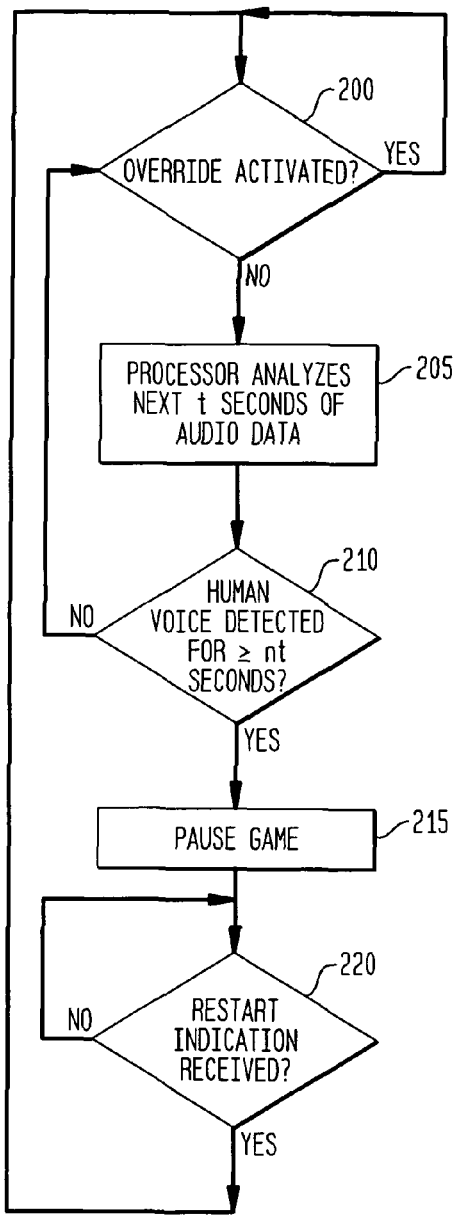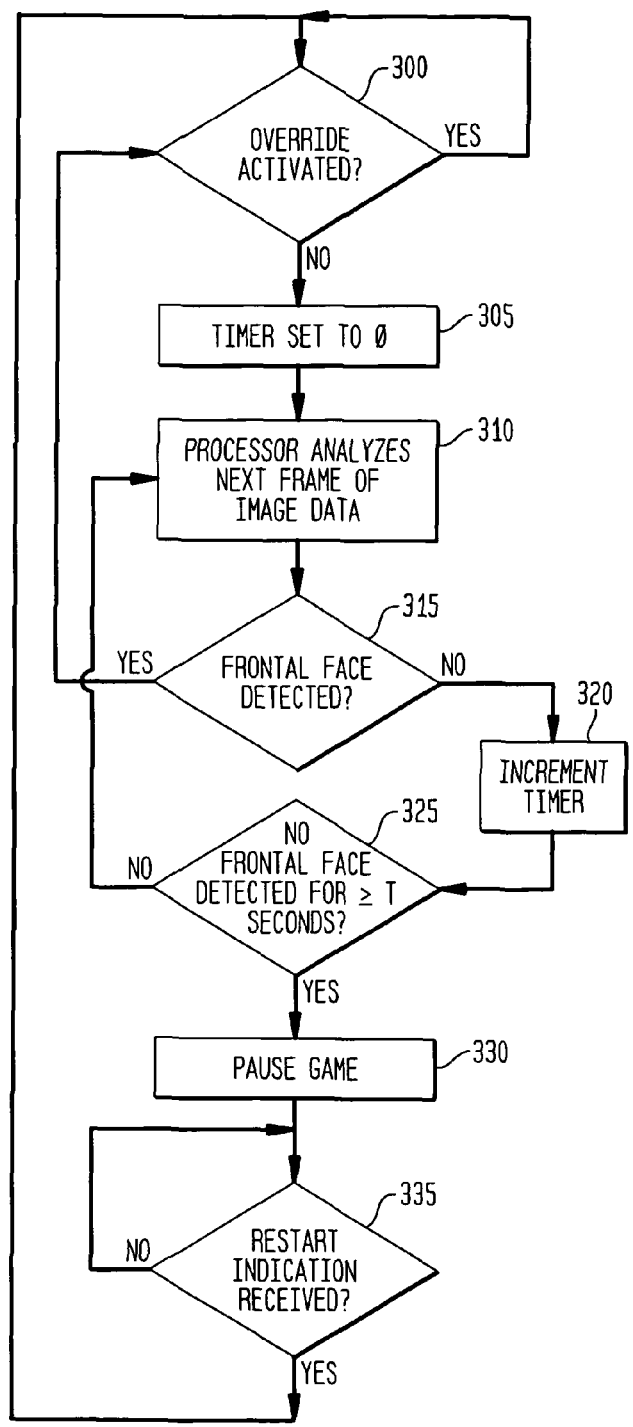

SYSTEM AND METHOD FOR DETECTING USER ATTENTION

CROSS-REFERENCE TO RELATED APPLICATION

The present application claims benefit of U.S. Provisional Application No. 60/718,145, filed Sep. 15, 2005, the disclosure of which is hereby incorporated by reference herein.

FIELD OF THE INVENTION

The present invention relates to conditioning execution of a control function on a determination of whether or not a person's attention is directed toward a predetermined device, and more particularly, to pausing a video game when it is determined that the attention of a person playing the video game has been averted from the game for a significant period of time.

BACKGROUND OF THE INVENTION

An important consideration in the design video game systems is the provision of a "pause" function. The pause function allows a player to pause, or "freeze," a game at a given point in time, tend to a matter that is not related to the game, and then resume the game at the point where it was paused. In this manner, the player's activity within the game does not lapse due to continuation of the game during a period when the player's attention is elsewhere. Thus, the player's performance within the game is not adversely affected by interruptions.

The pause function provided in prior video game systems requires the player to take an affirmative step to pause the game. For example, the player must press a button on a handheld controller.

The requirement that a player take an affirmative step to pause a game is often inconvenient. In games where precise timing is critical to successful play, the period of time it takes for a player to initiate a pause can adversely affect the player's success in the game, and thereby detract from the player's enjoyment. This is particularly true when the player is interrupted on numerous occasions during play.

In view of the drawbacks associated with prior implementations of the video game pause function, the inventors of the present system and method have recognized that it is desirable to provide a video game pause function which is initiated automatically upon aversion of a player's attention from the game.

Further, the inventors of the present system and method have recognized that an automatically initiated pause function is desirable not only in the context of video games but in the context of video display systems in general. For example, a person viewing a pre-recorded video on a DVD (Digital Versatile Disk) or DVR (Digital Video Recorder) system may be interrupted before being able to take an affirmative step to pause the video. In such a case, an automatic pause function can freeze the video at the point of interruption so that the person can resume viewing at the point of interruption without having to perform a reverse search to find the point of interruption.

Still further, the inventors of the present system and method have recognized that an automatic pause function for a video system can be efficiently implemented by monitoring the attention of the video system user(s). Moreover, the inventors have recognized that monitoring the attention of a user is beneficial not only in the context of providing an automatic pause function for a video system but in the broader context of controlling processes in general. For example, a voice-controlled video system can be designed to respond to voice commands only when the attention of a user is directed toward the system's display screen.

SUMMARY OF THE INVENTION

A system and method for conditioning execution of a control function on a determination of whether or not a person's attention is directed toward a predetermined device.

BRIEF DESCRIPTIONS OF THE DRAWINGS

The following detailed description, given by way of example, but not intended to limit the invention solely to the specific embodiments described, may best be understood in conjunction with the accompanying drawings wherein like reference numerals denote like elements and parts, in which:

FIG. 3A is a flow chart showing the steps included in an audio data analysis scheme of a preferred embodiment.

FIG. 3B is a flow chart showing the steps included in an image data analysis scheme of a preferred embodiment.

DETAILED DESCRIPTION

Figure 1A:
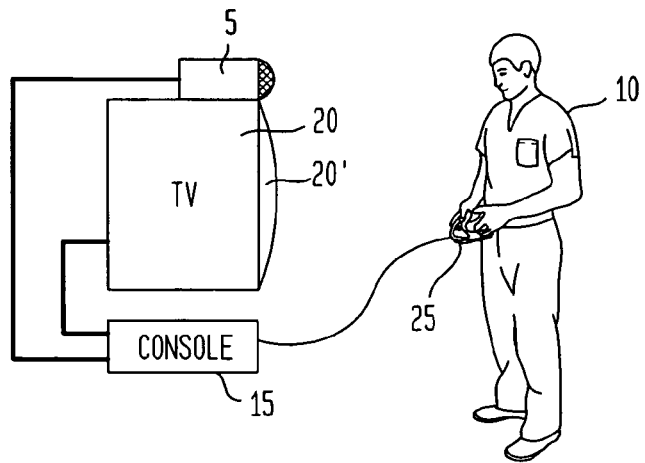
FIG. 1A is a plan view of a first embodiment in which a microphone is used to monitor the activity of a person playing a video game.

FIG. 1A is a plan view of a first embodiment in which a microphone 5 is used to monitor the activity of a person 10 playing a video game. As can be seen from the figure, a video game console 15 is coupled to both the microphone and a television set 20. Video associated with the video game is displayed on screen 20' of the television set. The person interacts with the game through a handheld controller 25 coupled to the console.

It should be noted that the couplings between the console and handheld controller, console and television, and console and microphone are not limited to hardwire couplings, or to hardwire couplings of any particular type. Indeed, each of the couplings can be in the form of twisted-shielded-pair wiring, coaxial cable, fiber optic cable, wireless link, and the like.

It should be further noted that although the microphone and console are shown as two separate components, they may be a single component. For example, the microphone may be integrated within the console such that there is no external coupling between the microphone and console.

Further, the microphone may be integrated within the handheld controller or within a wireless headset.

Still further, the microphone need not be limited to a single microphone element. For example, the microphone may be in the form of an array of microphone elements.

In one configuration, the microphone is positioned in close proximity to the display screen. In such configuration, the microphone preferably has a sensitivity pattern that enables the microphone to detect human voices of a volume greater than a whisper and at distance no less than the maximum distance between person 10 and screen 20' during the time of play. Since the person interacts with the game through the handheld controller, the maximum distance that the person can be from the screen while playing the game is the same as the maximum distance that the controller can be from the screen. When the controller is coupled to the console through a hardwired coupling the maximum distance is the greatest distance that the controller can be moved from the screen without severing any of the couplings between the console and controller, console and television, or console and microphone. When the controller is a wireless controller, the maximum distance is the greatest distance that the controller can be moved from the screen without significantly degrading communication between the controller and console.

In any event, the microphone monitors the person's activity by monitoring the person's voice. More particularly, the microphone converts the sound waves corresponding to the person's voice to an electrical signal which serves as an indication of the person's voice activity. The electrical signal is transferred to the console where the signal is analyzed. If the analysis of the signal indicates that the person is involved in a conversation that is distracting the player from the video on display screen 20', the console pauses the game. Notably, such pausing of the game is automatic and requires no affirmative action by the player.

Figure 1B:
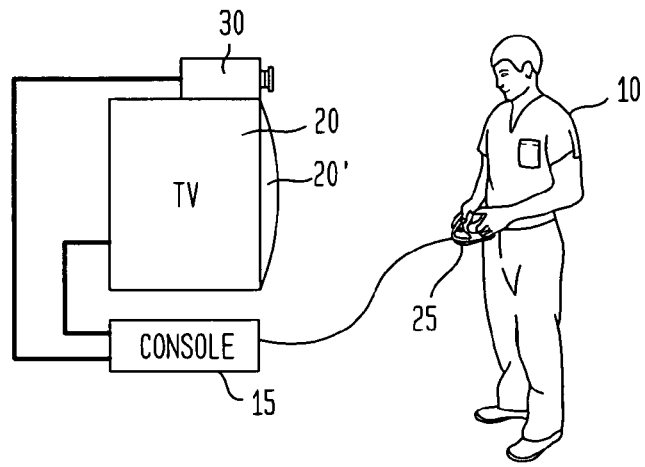
FIG. 1B is a plan view of a second embodiment in which a camera is used to monitor the activity of a person playing a video game.

FIG. 1B is a plan view of a second embodiment in which a camera 30 is used to monitor the activity of a person 10 playing a video game. The camera is preferably positioned in close proximity to television set 20 and is oriented such that its field of view corresponds to the field from which display screen 20' can be viewed by the player. In this manner, the camera monitors the activity of the person playing the video game by monitoring the person's face as the person observes the video being displayed on the screen.

It should be noted that, the alternative signal couplings discussed in connection with the FIG. 1A embodiment are applicable to the FIG. 1B embodiment. Further, it should be noted that although the camera and console are shown as two separate components, they may be a single component.

Preferably, the camera images an area corresponding to the area within which the person can be located while playing the game. Since the person interacts with the game through the handheld controller, the area within which the person can be located while playing the game corresponds to the area within which the controller can be located while the game is in play. This area is determined by the maximum distance that the controller can be from the screen. When the controller is coupled to the console through a hardwired coupling the maximum distance is the greatest distance that the controller can be moved from the screen without severing any of the couplings between the console and controller, console and television, or console and microphone. When the controller is a wireless controller, the maximum distance is the greatest distance that the controller can be moved from the screen without severing any of the couplings between the console and controller, console and television, or console and microphone.

The camera is preferably a video camera, although a camera that captures still images can be used in the alternative.

In any case, the images generated by the camera are converted into an electrical signal and transferred to the console for analysis. Using facial detection software, the console determines if a frontal face is present in the images. That is, the console analyzes the image signal to determine if the person is looking toward the camera. Since the camera is in close proximity to the television set and is aligned with the display screen, a determination that the person is not looking at the camera makes it highly probable that the person is not looking at the display screen. Thus, if analysis of the image signal indicates that the person is not looking toward the camera, it is concluded that the person is not looking toward the display screen and the game is paused—without any affirmative action by the person.

It should be noted that if there is no person in the camera's field of view, no frontal face will be detected by the camera. Accordingly, if a person is playing the video game and walks away from the game such that no person is in the camera's field of view, no frontal face will be detected and the game will be paused.

Figure 1C:
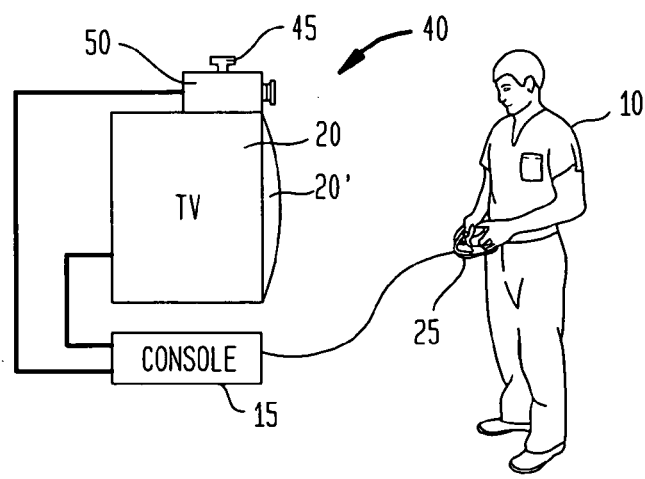
FIG. 1C is a plan view of a third embodiment in which a camera and microphone are used to monitor the activity of a person playing a video game

FIG. 1C is a plan view of a third embodiment in which a camera 50 and a microphone 45 are used to monitor the activity of a person playing a video game. The camera and microphone of FIG. 1C are preferably integrated into a single unit 40, in which case the signals from the camera and microphone are multiplexed onto a single coupling for transmission to console 15. However, the camera and microphone may be provided as separate units with respective couplings to console 15.

The preferences for camera and microphone positioning in the FIG. 1C embodiment are the same as those for the FIGS. 1A and 1B embodiments. Thus, it is preferred that the combined camera/microphone (unit 40) of FIG. 1C be positioned in close proximity to the display screen with the camera oriented such that its field of view corresponds to the field from which display screen 20' can be viewed.

The console processes signals generated by microphone 45 and camera 50 to determine if the signals indicate that the person's attention has been averted from the game. In the case of processing an electrical signal generated by the microphone, the processing discussed in connection with FIG. 1A applies. In the case of processing an electrical signal generated by the camera, the processing discussed in connection with FIG. 1B applies. In one implementation, the game is paused if either of the microphone signal or camera signal indicates that the person's attention has been averted form the game. In an alternative implementation, the game is paused only when both the microphone signal and camera signal indicate that the person's attention has been averted form the game. Thus, in the first implementation, the game is paused when the microphone signal indicates that the player is involved in a conversation or when the camera signal indicates that the player is not looking at the screen. In the second implementation, the game is paused when the microphone signal indicates that the player is involved in a conversation and the camera signal indicates that the player is not looking at the screen. In any case, if the player's attention has been averted from the game the game is paused—without any affirmative action by the player.

As in the FIG. 1A and FIG. 1B embodiments, the couplings of the FIG. 1C embodiment may take many alternative forms. Further, in the FIG. 1C embodiment, the camera, the microphone, or both may be integrated within the game console.

Having provided an overview of three embodiments, a more detailed description of the three embodiments will now be provided.

Figure 2A:
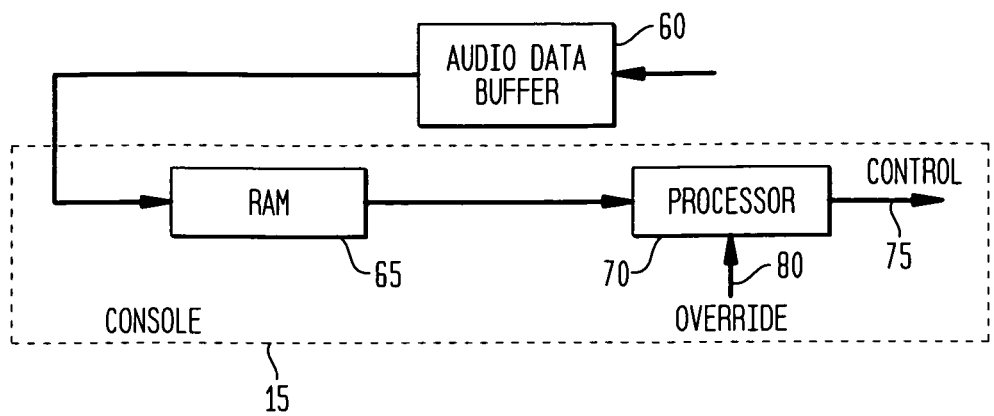
FIG. 2A is a block diagram useful in describing how data acquired in accordance with the FIG. 1A configuration is processed.

FIG. 2A is a block diagram useful in describing how data acquired in accordance with the FIG. 1A embodiment is processed. As can be seen from FIG. 2A, audio data acquired by the microphone of FIG. 1A is stored in an audio data buffer 60 within the microphone. More specifically, the microphone converts sound waves incident upon its sensing surface to an analog electrical signal, the analog signal undergoes analog-to-digital conversion, and the resulting digital signal is stored in buffer 60. Thus, the audio data buffer stores a multiple of temporal samples representing sound sensed by the microphone. The rate at which the analog signal is sampled to create the digital signal is preferably greater than 8 KHz, and most preferably greater than 16 KHz.

The digital samples stored in buffer 60 are transferred to a random access memory (RAM) 65 within the game console. To this end, the buffer is preferably coupled to the game console via a universal serial bus (USB) interface and the audio samples are preferably transferred from the buffer to the RAM in the form of packets. Once the samples are in RAM 65 they can be analyzed by a processor 70 within the console.

The processor analyzes the audio data stored in RAM 65 to determine if the data indicates the presence of a human voice. In one embodiment, subsets of the data stored in RAM 65 are considered, each subset corresponding to a time period equal to the number of samples in the subset multiplied by the sampling rate. In such embodiment, the processor performs a frequency domain transformation on each subset in order to determine the subset's spectral content. For each subset, the spectral content is observed to determine if it includes a tone within the range associated with the fundamental frequency of the human voice (generally between 60 Hz and 350 Hz). If the spectral content for a given subset includes a tone within the range of 60-350 Hz, it is concluded that human voice activity occurred during the time period associated with the subset. In another embodiment, data stored in RAM 65 is analyzed using one or more previously trained acoustic models. Such models can detect the presence of a human voice by recognizing one or more patterns in the data.

It has been determined that samples corresponding to a period of about 0.3 seconds or greater is needed in order to make a meaningful determination of whether or not there is human voice activity during the period. Accordingly, the processor preferably analyzes the audio data in subsets of samples that correspond to periods of 0.3 seconds or greater. If human voice activity is detected for a predetermined consecutive number of such periods, it is determined that a conversation is taking place and that the attention of the person playing the video game has therefore been averted from the screen. Thus, when it is determined that a conversation is taking place the processor generates a control signal 75 to pause the game. For example, if human voice activity is detected for 30 consecutive 0.3 second periods (9 seconds), the game is paused.

The automatic pause function can be disabled by sending an override signal 80 to the processor. Such override signal can be generated, for example, in response to the player's activation of a button on the game controller. Upon receiving the override signal the processor no longer analyzes the audio data for human voice content.

Figure 2B:
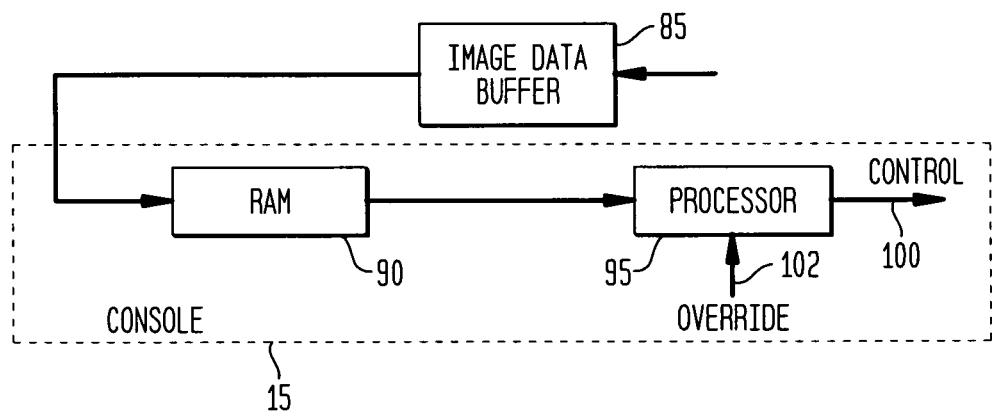
FIG. 2B is a block diagram useful in describing how data acquired in accordance with the FIG. 1B configuration is processed.

FIG. 2B is a block diagram useful in describing how data acquired in accordance with the FIG. 1B configuration is processed. As can be seen from FIG. 2B, image data acquired by the camera of FIG. 1B is stored in an image data buffer 85. More specifically, the camera converts images into digital electrical signals which are stored in buffer 85. The images may be black and white images or color images, and they may be video images or still images.

In a preferred embodiment, the camera includes a charge coupled device (CCD) image sensor which generates a rectangular array of pixels representing the image viewed by the camera. In one implementation of the preferred embodiment, the array includes 320 rows and 240 columns of pixels and is generated 60 times a second. Each rectangular array of pixels is said to represent one "frame" of data. Thus, in the preferred embodiment the "frame-rate" is 60 frames per second. In this manner, a multiple of temporal samples is stored in the image data buffer, each temporal sample being made up of an array of pixels.

The image data is transferred from the image data buffer to a RAM 90 within the game console. It is preferred that the image data is transferred to the RAM in an uncompressed form. However, in an alternative embodiment the image data is compressed prior to being transferred to the RAM. In any case, the coupling between the camera buffer and RAM 90 is preferably a USB coupling.

The image data stored in RAM 90 is periodically analyzed by a processor 95 within the game console to determine if the images represented by the image data include a frontal view of a human face.

If a frame of data includes a frontal view of a human face it is determined that a human was looking toward the camera at the time the frame was imaged. Since the camera is positioned such that a person who is looking toward the screen is also looking toward the camera, the detection of a frontal face in a frame of data means that a person was looking toward the screen at the time the frame was imaged. Thus, when a frontal face is detected it is said that a person is looking toward the screen and that the person's attention is therefore directed toward the screen. When a frontal face is not detected it is said that no person is directing attention toward the screen, either because no person in the camera's field of view is looking toward the screen or because there is no person in the camera's field of view.

Therefore, if a frontal face is not detected it is determined that the player of the video game is not directing attention to the screen and that the game should be paused.

However, a brief glance away from the screen does not typically mean that the player's attention has been averted to the degree necessary to justify automatic pausing of the game. Accordingly, in a preferred embodiment the processor causes the game to be paused only if there has been no frontal face detection for a predetermined number of consecutive frames. When no frontal face has been detected for the predetermined number of consecutive frames, the processor generates a control signal 100 to pause the game. In the embodiment that generates data at 60 frames a second, the processor pauses the game if no frontal face has been detected in 600 consecutive frames (i.e. no frontal face has been detected for 10 seconds).

The automatic pause function can be disabled by sending an override signal 102 to the processor. Such override signal can be generated, for example, in response to the person's activation of a button on the game controller. Upon receiving the override signal the processor no longer analyzes the image data for frontal face content.

Figure 2C:
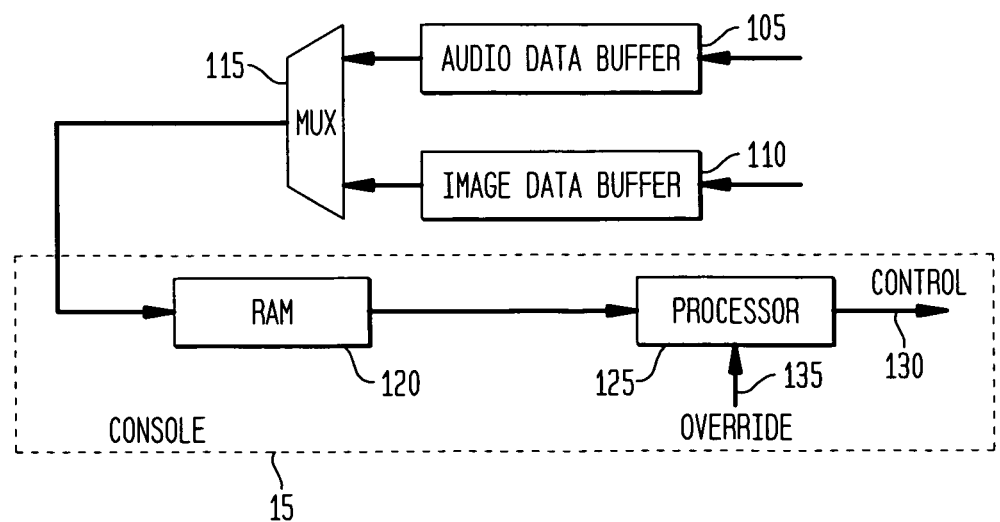
FIG. 2C is a block diagram useful in describing how data acquired in accordance with the FIG. 1C configuration is processed.

FIG. 2C is a block diagram useful in describing how data acquired in accordance with the FIG. 1C configuration is processed. As can be seen from FIG. 2C, audio data acquired by the microphone is stored in an audio data buffer 105 and image data acquired by the camera is stored in an image data buffer 110. The buffers may be two distinct pieces of hardware as shown, or may occupy distinct areas of a single piece of hardware. In any event, the data from the two buffers is multiplexed by a multiplexer 115 so that it can be transferred over a single coupling to a RAM 120 within the game console.

In a preferred embodiment, the multiplexer performs a time-division multiplexing on the audio data and image data such that the multiplexed data includes a plurality of audio packets and a plurality of image data packets. In such embodiment, the multiplexer is coupled to the game console via a USB coupling. Further, the image data is preferably uncompressed prior to being multiplexed with the audio data; however, in an alternative embodiment the image data is compressed prior to being multiplexed with the audio data.

The audio data and image data stored in RAM 120 is periodically analyzed by a processor 125 to determine whether or not the video game player's attention has been averted from the screen. The audio data is analyzed in the same manner as discussed in connection with FIG. 2A and the image data is analyzed in the same manner as discussed in connection with FIG. 2B. If either the audio data analysis or image data analysis indicates that the player's attention has been averted from the screen, the processor generates a control signal 130 to pause the game.

As in the FIGS. 2A and 2B embodiments, an override signal 135 may be generated to disable the automatic pause function.

FIG. 3A is a flow chart showing the steps included in an audio data analysis scheme of a preferred embodiment. The first step in the audio data analysis is to check if the automatic pause function override is activated (step 200). If the override is activated, the process continues to monitor the override. If the override is not activated, the processor analyzes the next "t" seconds worth of audio samples to determine if a human voice is present in the samples (step 205). Preferably, "t" is equal to or greater than 0.3 seconds.

Next, the process determines whether or not there has been human voice detected for "n" consecutive "t" second periods ("n" being an integer>1) (step 210). If there has been a human voice detected for "n" consecutive "t" second periods, the process pauses the game (step 215). Otherwise, the process loops back to step 200.

When the game is in the pause state the process checks for a restart indication (step 220). Such indication may be provided, for example, by activation of a button on the handheld controller. Thus, if the person playing the game gets involved in a conversation and the game is automatically paused, the person can resume the game upon completion of the conversation by depressing a button on the handheld controller. If a restart indication is received, the process loops back to step 200.

FIG. 3B is a flow chart showing the steps included in an image data analysis scheme of a preferred embodiment. The first step in the image data analysis is to check if the automatic pause function override is activated (step 300). If the override is activated, the process continues to monitor the override. If the override is not activated, the process sets a timer to 0 seconds (step 305) and then analyzes the next frame of image data (step 310). A determination is made as to whether or not the frame of data includes a frontal face (step 315). If a frontal face has been detected, the process loops back to step 300. If a frontal face has not been detected, the timer is incremented by the amount of 1/frame-rate (step 320). Thus, for a framerate of 60 frames/second the timer would be incremented by 1/60 seconds or 0.017 seconds.

After the timer is incremented, a determination is made as to whether or not no frontal face has been detected for "T" or more seconds (step 325). Such determination is made by observing the value of the timer. If it is determined that a frontal face has not been detected for "T" or more seconds, the game is paused (step 330). Otherwise, the process loops back to step 310 and the next frame of image data is analyzed.

When the game is in the pause state the process checks for a restart indication (step 335). Such indication may be provided, for example, by activation of a button on the handheld controller. Thus, if the person playing the game looks away from the screen for an extended period and the game is automatically paused, the person can resume the game by activating a button on the handheld controller. If a restart indication is received, the process loops back to step 300.

In a preferred embodiment, the step of determining whether or not a frame of data includes a frontal face (step 315) is performed according to a two-tiered process. The first step in implementing the two-tiered process for a current frame is to check whether or not a frontal face was detected in the immediately preceding frame. If the immediately preceding frame does not include a frontal face, an intensive frontal face detection algorithm is executed to search for frontal faces in the current frame. If the immediately preceding frame does include a frontal face, a less intensive frontal face detection algorithm is executed to search for frontal faces in the current frame.

The less intensive algorithm used to search for frontal faces is a "template matching" algorithm. The algorithm uses a frontal face detected in the immediately preceding frame as a template. The template is compared to the current frame to see if there is an area within the current frame that matches the template closely enough to conclude that the current frame includes a frontal face like the frontal face detected in the immediately preceding frame. In an illustrative embodiment, the template has a rectangular shape of 32 pixel rows×24 pixel columns and includes the pixels that define the frontal face detected in the immediately preceding frame. One can think of the matching process as sliding the template around on top of the current frame of data (e.g. a 320×240 size frame) and observing where the template matches the underlying data. Preferably, a match is said to occur when a mathematical measure of the similarity between the pixels of the template and the pixels of the underlying data exceeds a predetermined threshold.

If the immediately preceding frame includes more than one frontal face, each of the frontal faces may be used as a template. In this manner it is determined whether or not the current frame includes at least one of the frontal faces detected in the immediately preceding frame. Thus, if "n" frontal faces were detected in the immediately preceding frame ("n" being an integer≥1), "n" templates are compared to the current frame. If one or more of the "n" templates matches an area in the current frame, the current frame is said to include a frontal face.

If the immediately preceding frame of data includes one or more frontal faces but the template matching algorithm does not detect a frontal face in the current frame of data, the intensive face detection algorithm is executed for the current frame of data.

Incorporating the template matching algorithm into the process of detecting frontal faces reduces the burden that the face detection process places on the system hardware. That is, the template matching algorithm requires significantly fewer calculations than the intensive face detection algorithm and thus reduces the number of calculations that are performed in cases where two consecutive frames include a similar frontal face. Such cases will be the norm since video displays are commonly viewed by a person for periods corresponding to a large number of consecutive frames. Accordingly, the incorporation of the template matching algorithm reduces the average number of calculations-per-frame that the system hardware (e.g. processor 95) must perform.

As these and other variations and combinations of the features discussed above can be utilized without departing from the present invention as defined by the claims, the foregoing description of the preferred embodiments should be taken by way of illustration rather than by way of limitation of the invention as defined by the claims. For example, while a large part of the description concerns application of the invention in the context of video games, the invention is not limited to video games. Other contexts in which the invention can be applied include DVD and DVR systems. In addition, while a large part of the description concerns the application of the invention in the context of providing an automatic pause function, the invention is not limited to providing an automatic pause function. Indeed, the invention is generally applicable to conditioning execution of a control function on a determination of whether or not a person's attention is directed toward a predetermined device. For instance, in an alternative embodiment the attention of a user of a voice-controlled video system is monitored by using a camera to detect frontal faces, and the system responds to a spoken voice-command only when the camera has imaged a frontal face at the same time that the command was spoken. Thus, if the voice command "skip" corresponds to the "fast-forward" function, the system will fast-forward only when it determines that the word "skip" has been spoken at the same time that a frontal face was imaged by the camera. If the spoken word "skip" is detected but there is no detection of a simultaneous frontal face the fast-forward function is not executed.

The voice-command system embodiment provides an improvement over prior voice-command systems in that the embodiment reduces the number of instances in which voice-commanded functions are executed when they are not intended. For instance, when a command word that is not intended to invoke a voice-commanded function is spoken during a conversation between a system user and another person the user and other person will generally be looking toward each other and not at the display screen. Therefore, in such an event there is no frontal face detection at the time of the spoken command word and the system does not respond to the command word. Thereby, avoiding an unintended execution of the function associated with the command word.

In the voice-command system example, a control function (fast-forwarding) is enabled only by a determination that a person's attention is directed toward a predetermined device (the display screen). However it should be noted that, as an alternative, execution of a control function may be enabled only by a determination that a person's attention is not directed toward a predetermined device.

The invention claimed is:

1. A system for pausing video being displayed on a video display screen, comprising:
   at least one sensor for acquiring data concerning the activity of a person who is in the proximity of the display screen, the data being in the form of one or more temporal samples; and
   a processor for analyzing one or more of the temporal samples to determine if the person is in the vicinity of the display screen but has looked away from the screen for a predetermined period of time and has engaged in a conversation for a predetermined period of time, and automatically pausing the video being displayed on the display screen when it is determined that the person is in the vicinity of the display screen but has looked away from the screen for a predetermined period of time and has engaged in a conversation for a predetermined period of time,
   a determination of whether or not a person in the vicinity of the display screen has looked away from the screen for a predetermined period of time includes searching successive images of the vicinity to detect the presence or absence of a frontal face corresponding to the person, wherein when a multiple of frontal faces are detected in one of the images each of the detected frontal faces is used as a template for searching for one or more frontal faces in at least the immediately succeeding image, and
   a determination of whether or not a person in the vicinity of the display screen has engaged in a conversation for a predetermined period of time includes searching a plurality of successive subsets of audio data having a predetermined duration to detect the presence or absence of human voice activity in each subset and determining whether or not human voice activity is present in a predetermined consecutive number of the subsets,
   the images that are searched when determining whether or not a person in the vicinity of the display screen has looked away from the screen are acquired by a camera that is a component of a video game system with which the person interacts through a handheld controller, and the camera is oriented such that the camera images an area within which the controller can be located while the game is in play.

2. The system according to claim 1, wherein the at least one sensor includes a microphone.

3. The system according to claim 2, wherein the data is digital audio samples.

4. The system according to claim 3, wherein the processor analyzes the spectral content of the data.

5. The system according to claim 4, the processor determines whether or not the data includes a human voice fundamental frequency in the range of 60 Hz to 350 Hz.

6. The system according to claim 3, wherein the processor applies one or more previously trained acoustic models to the data to detect whether or not the data indicates the presence of a human voice.

7. The system according to claim 1, wherein the temporal samples are pixel arrays, each temporal sample being an array of pixels that represents an image.

8. The system according to claim 7, wherein the processor analyzes at least one of the pixel arrays to determine whether or not the image corresponding to the pixel array includes a frontal face.

9. The system according to claim 8, wherein the processor analyzes at least one of the pixel arrays by selectively applying an intensive frontal face detection algorithm and a less intensive frontal face detection algorithm.

10. A method for pausing video being displayed on a video display screen, comprising the steps of:
   acquiring data concerning the activity of a person who is in the proximity of the display screen, the data being in the form of one or more temporal samples;
   analyzing one or more of the temporal samples to determine if the person is in the vicinity of the display screen but has looked away from the screen for a predetermined period of time and has engaged in a conversation for a predetermined period of time; and
   automatically pausing the video being displayed on the screen when it is determined that the person is in the vicinity of the display screen but has looked away from the screen for a predetermined period of time and has engaged in a conversation for a predetermined period of time, a determination of whether or not a person in the vicinity of the display screen has looked away from the screen for a predetermined period of time includes searching successive images of the vicinity to detect the presence or absence of a frontal face corresponding to the person, wherein when a multiple of frontal faces are detected in one of the images each of the detected frontal faces is used as a template for searching for one or more frontal faces in at least the immediately succeeding image, and a determination of whether or not a person in the vicinity of the display screen has engaged in a conversation for a predetermined period of time includes searching a plurality of successive subsets of audio data having a predetermined duration to detect the presence or absence of human voice activity in each subset and determining whether or not human voice activity is present in a predetermined consecutive number of the subsets, the images that are searched when determining whether or not a person in the vicinity of the display screen has looked away from the screen are acquired by a camera that is a component of a video game system with which the person interacts through a handheld controller, and the camera is oriented such that the camera images an area within which the controller can be located while the game is in play.

11. The method according to claim 10, wherein the step of acquiring data comprises the step of acquiring data through use of a microphone.

12. The method according to claim 11, wherein the step of acquiring data comprises the step of acquiring plurality of digital audio samples.

13. The method according to claim 12, wherein the step of analyzing comprises the step of analyzing the spectral content of the data.

14. The method according to claim 13, wherein the step of analyzing includes the step of determining whether or not the data includes a human voice fundamental frequency in the range of 60 Hz to 350 Hz.

15. The system according to claim 10, wherein the step of analyzing includes the step of applying one or more previously trained acoustic models to the data to detect whether or not the data indicates the presence of a human voice.

16. The method according to claim 10, wherein the step of acquiring data comprises the step of acquiring a plurality of pixel arrays representing images.

17. The method according to claim 16, wherein the step of analyzing comprises the step of analyzing at least one of the pixel arrays to determine whether or not an image corresponding to the pixel array includes a frontal face.

18. The method according to claim 17, wherein the step of analyzing includes selectively applying an intensive frontal face detection algorithm and a less intensive frontal face detection algorithm.

19. A system for pausing a video game, comprising:
at least one sensor for acquiring data concerning the activity of a person playing the video game, the game being displayed on a video display screen, and the data being in the form of one or more temporal samples; and
a processor for analyzing one or more of the temporal samples to determine if the person is in the vicinity of the display screen but has looked away from the screen for a predetermined period of time and has engaged in a conversation for a predetermined period of time, and automatically pausing the video being displayed on the screen when it is determined that the person is in the vicinity of the display screen but has looked away from the screen for a predetermined period of time and has engaged in a conversation for a predetermined period of time, a determination of whether or not a person in the vicinity of the display screen has looked away from the screen for a predetermined period of time includes searching successive images of the vicinity to detect the presence or absence of a frontal face corresponding to the person, wherein when a multiple of frontal faces are detected in one of the images each of the detected frontal faces is used as a template for searching for one or more frontal faces in at least the immediately succeeding image, and a determination of whether or not a person in the vicinity of the display screen has engaged in a conversation for a predetermined period of time includes searching a plurality of successive subsets of audio data having a predetermined duration to detect the presence or absence of human voice activity in each subset and determining whether or not human voice activity is present in a predetermined consecutive number of the subsets, the images that are searched when determining whether or not a person in the vicinity of the display screen has looked away from the screen are acquired by a camera that is a component of a video game system with which the person interacts through a handheld controller, and the camera is oriented such that the camera images an area within which the controller can be located while the game is in play.

20. The system according to claim 19, wherein the at least one sensor includes a microphone.

21. A system for conditioning execution of a control function on a determination of whether or not a person's attention is directed toward a predetermined device, comprising:
at least one sensor for acquiring data concerning the activity of a person who is in the proximity of the device, the data being in the form of one or more temporal samples; and
a processor for analyzing one or more of the temporal samples to make a determination as to whether or not the person is in the vicinity of the device but has looked away from the device for a predetermined period of time and has engaged in a conversation for a predetermined period of time, and selectively executing the control function when it is determined that the person is in the vicinity of the device but has looked away from the device for a predetermined period of time and has engaged in a conversation for a predetermined period of time, a determination of whether or not a person in the vicinity of the device has looked away from the device for a predetermined period of time includes searching successive images of the vicinity to detect the presence or absence of a frontal face corresponding to the person, wherein when a multiple of frontal faces are detected in one of the images each of the detected frontal faces is used as a template for searching for one or more frontal faces in at least the immediately succeeding image, and a determination of whether or not a person in the vicinity of the device has engaged in a conversation for a predetermined period of time includes searching a plurality of successive subsets of audio data having a predetermined duration to detect the presence or absence of human voice activity in each subset and determining whether or not human voice activity is present in a predetermined consecutive number of the subsets, the images that are searched when determining whether or not a person in the vicinity of the device has looked away from the device are acquired by a camera that is a component of a video game system with which the person interacts through a handheld controller, and the camera is oriented such that the camera images an area within which the controller can be located while the game is in play.

22. The system according to claim 21, wherein execution of the control function is enabled only when the person's attention is directed toward the device.

23. The system according to claim 22, wherein the control function is a function executed in response to a voice command.

24. The system according to claim 22, wherein the device is a display screen.

25. The system according to claim 21, wherein execution of the control function is enabled only when the person's attention is not directed toward the device.

26. The system according to claim 25, wherein the control function is a function executed in response to a voice command.

27. The system according to claim 25, wherein the device is a display screen.

* * * * *